(12) United States Patent
Komatsu et al.

(10) Patent No.: US 9,891,975 B2
(45) Date of Patent: Feb. 13, 2018

(54) FAILURE PREDICTION SYSTEM OF CONTROLLER

(71) Applicant: FANUC Corporation, Minamitsuru-gun, Yamanashi (JP)

(72) Inventors: Takaaki Komatsu, Minamitsuru-gun (JP); Yasumichi Sakoda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 61 days.

(21) Appl. No.: 15/019,051

(22) Filed: Feb. 9, 2016

(65) Prior Publication Data
US 2016/0246659 A1    Aug. 25, 2016

(30) Foreign Application Priority Data
Feb. 19, 2015   (JP) .................. 2015-030693

(51) Int. Cl.
*G06F 11/00* (2006.01)
*G06F 11/07* (2006.01)
*G06F 11/34* (2006.01)

(52) U.S. Cl.
CPC ........ *G06F 11/0751* (2013.01); *G06F 11/008* (2013.01); *G06F 11/0748* (2013.01); *G06F 11/3452* (2013.01)

(58) Field of Classification Search
CPC ............. G06F 11/3452; G06F 11/0751; G06F 11/0748
See application file for complete search history.

(56) References Cited

U.S. PATENT DOCUMENTS

| 5,596,712 A * | 1/1997 | Tsuyama | G06F 11/2257 714/26 |
| 6,556,952 B1 * | 4/2003 | Magro | G06F 11/3409 702/182 |
| 7,107,491 B2 * | 9/2006 | Graichen | G06F 11/008 714/26 |
| 7,509,235 B2 * | 3/2009 | Bonissone | G06Q 40/06 702/181 |

(Continued)

FOREIGN PATENT DOCUMENTS

| JP | H05-143377 A | 6/1993 |
| JP | H06-161796 A | 6/1994 |

(Continued)

OTHER PUBLICATIONS

Bianca Schroeder, "DRAM error not uncommon, according to Google's large-scale survey," Nikkei Electronics, Jan. 11, 2010, pp. 81-88, issue 1021 (in Japanese language).

(Continued)

*Primary Examiner* — Yolanda L Wilson
(74) *Attorney, Agent, or Firm* — Drinker Biddle & Reath LLP

(57) ABSTRACT

From an error information containing a content of a correctable error that has occurred in a controller of a failure prediction system and an ID of the controller and manufacturing information of a machine to which the controller is attached, a failure of a controller belonging to a group of controllers in which such an error as indicated in the error information has not occurred yet is predicted.

2 Claims, 5 Drawing Sheets

(56) References Cited

U.S. PATENT DOCUMENTS

| | | | | |
|---|---|---|---|---|
| 7,600,202 | B1* | 10/2009 | Burnham | G06F 17/504 716/136 |
| 2005/0017686 | A1* | 1/2005 | Sakakibara | G01R 31/3679 320/132 |
| 2009/0150599 | A1* | 6/2009 | Bennett | G06F 11/1441 711/103 |
| 2010/0205371 | A1* | 8/2010 | Tanaka | G06F 3/0605 711/114 |
| 2010/0318837 | A1* | 12/2010 | Murphy | G06F 11/1461 714/4.1 |
| 2014/0024348 | A1* | 1/2014 | Hurst | H04M 3/5232 455/414.1 |
| 2014/0281713 | A1* | 9/2014 | Hampapur | G06F 11/079 714/26 |
| 2014/0358601 | A1* | 12/2014 | Smiley | G06Q 10/0635 705/7.11 |
| 2015/0127989 | A1* | 5/2015 | Zhou | G06F 11/3452 714/37 |
| 2015/0205657 | A1* | 7/2015 | Clark | G06F 11/008 714/47.3 |

FOREIGN PATENT DOCUMENTS

| | | |
|---|---|---|
| JP | H09-330251 A | 12/1997 |
| JP | 2002-149660 A | 5/2002 |
| JP | 2003-006139 A | 1/2003 |
| JP | 2006-163520 A | 6/2006 |
| JP | 2006-172175 A | 6/2006 |
| JP | 2008-27284 A | 2/2008 |
| JP | 2012-178014 A | 9/2012 |
| JP | 2014-228895 A | 12/2014 |

OTHER PUBLICATIONS

Notification of Reasons for Refusal dated Mar. 21, 2017 in Japanese Patent Application No. 2015-030693 (3 pages) with an English translation (2 pages).

* cited by examiner

DEPENDENCY ON PRODUCTION LOT OF COMPONENT

DEPENDENCY ON MACHINE

DEPENDENCY ON PRODUCTION LOT, TEMPERATURE OF COMPONENT

DEPENDENCY ON MACHINE, VIBRATION

FAILURE PREDICTION SYSTEM OF CONTROLLER

RELATED APPLICATION DATA

This application claims priority under 35 U.S.C. §119 and/or §365 to Japanese Application No. 2015-030693 filed Feb. 19, 2015, the entire contents is incorporated herein by reference.

BACKGROUND OF THE INVENTION

1. Field of the Invention

The present invention relates to a failure prediction system of a controller.

2. Description of the Related Art

In a manufacturing field typified by automobiles, productivity may be reduced due to a failure in a machine or a controller used in a manufacturing line of a product. Thus, in recent years, it is requested that necessary countermeasures be taken before a fatal error occurs in the controller.

As a technology for a preventive maintenance, there is known a method of notifying a recoverable error of the controller to a server so as to perform a countermeasure such as a component replacement or a parameter change with respect to the controller before a fatal error occurs.

For example, Japanese Patent Application Laid-Open No. 2012-178014 discloses a system in which a server periodically acquires information of terminals to calculate a deterioration progressing degree and performs a countermeasure against a failure based on the deterioration progressing degree. JP 2003-006139 A discloses a technology in which a retry event occurring in an ATM is transmitted to a monitor server, and a rotation speed of a cash feeding motor is changed when preventive maintenance information exceeds a threshold, so that a failure is prevented in advance.

In addition, Japanese Patent Application Laid-Open No. 2006-163520 discloses a technology in which a maintenance information transmission command is transmitted to each terminal from a server in a predetermined interval, and when the terminal transmits inspection data and a message to the server in response to the transmitted maintenance information transmission command, the inspection data received by the server is compared with a threshold, so that a failure of each terminal is predicted. Japanese Patent Application Laid-Open No. 05-143377 A discloses a system in which recoverable failures are counted in each terminal, and when the counted value exceeds a threshold, the fact is notified to the server.

Further, as an item related to failure prediction, it has been known that, if a correctable error occurs, for example, in a DRAM in a certain month, there is a high possibility that an uncorrectable error occurs in that month. Thus, it has been confirmed that it is meaningful to estimate an uncorrectable fatal error based on occurrence status of correctable errors (see "DRAM error is not uncommon/Google's extensive research", Nikkei Electronics, Nikkei Business Publications, Inc., Jan. 11, 2010, No. 1021, pp. 81 to 88).

However, in the related art, if a recoverable error occurs in a controller, it is possible to take a countermeasure for the controller. However, in a case where the error is caused from a quality defect of a memory mounted in the controller or in a case where the error depends on a type of a machine provided with the controller, there is a possibility that a similar fatal error may occur even in the controller in which components of the same lot are used. Therefore, it is difficult to take a countermeasure against these cases. In addition, in case where the error is derived from a design problem, similar errors may occur even in controllers having similar use conditions, an abrasion state and a hardware configuration close to each other.

SUMMARY OF THE INVENTION

The invention has been made to solve the problems, and an object thereof is to provide a failure prediction system of controllers, which can specify the controller having a possibility of occurrence of an error in future based on information obtained from the controller in which a correctable error has occurred.

In the failure prediction system of a controller according to the present invention, a plurality of controllers are connected to a server device through a network. The controller includes: at least one error correction unit; and an error transmitting unit transmitting error information to the server device, the error information containing a content of a correctable error that has occurred in the controller and a controller identification number for specifying the controller. The server device includes: a manufacturing information storage unit storing manufacturing information that contains at least one of a production lot of a component mounted in the controller and a model name of a machine to which the controller is attached; an error information storage unit recording the error information transmitted from the controller, a statistical process unit performing a statistical process based on the manufacturing information recorded in the manufacturing information storage unit and the error information recorded in the error information storage unit, and a failure predicting unit predicting a failure of a controller belonging to a controller group of the controllers in which an error similar to the error in the error information has not occurred, based on a result of the statistical process by the statistical process unit.

The controller may further include an environment information measuring unit to measure environment information, the error information may further contain the environment information measured by the environment information measuring unit, and the server device may further include an environment information collecting unit to collect the environment information from a controller group in which any error has not occurred, wherein the failure predicting unit may be configured to predict a failure of the controller belonging to the controller group in which any error has not occurred, based on a result of the statistical process and the environment information the environment information collecting unit collects from the controller group in which any error has not occurred.

The error information may further include design information of a component in which an error has occurred.

With the failure prediction system of the controller according to the invention, it is possible to specify the controller in which any error has not occurred yet but which has a possibility of occurrence of error in the near future, so that countermeasures can be taken before an error occurs. Further, with statistical processing taking into consideration environment information such as a temperature, vibration or the like, dependency of temperature is known, and, by also taking into consideration the environment information of controllers in which any error have not occurred yet, it is possible to enhance accuracy in the prediction of a failure. Furthermore, it is possible to find out a design problem by analyzing mounting positions of components, so that a quality of a design can be improved by reflecting the information to design work.

BRIEF DESCRIPTION OF THE DRAWINGS

The foregoing and other objects and features of the invention will be apparent from the following description of preferred embodiments of the invention with reference to the accompanying drawings, in which.

DETAILED DESCRIPTION OF THE PREFERRED EMBODIMENTS

Figure 1:
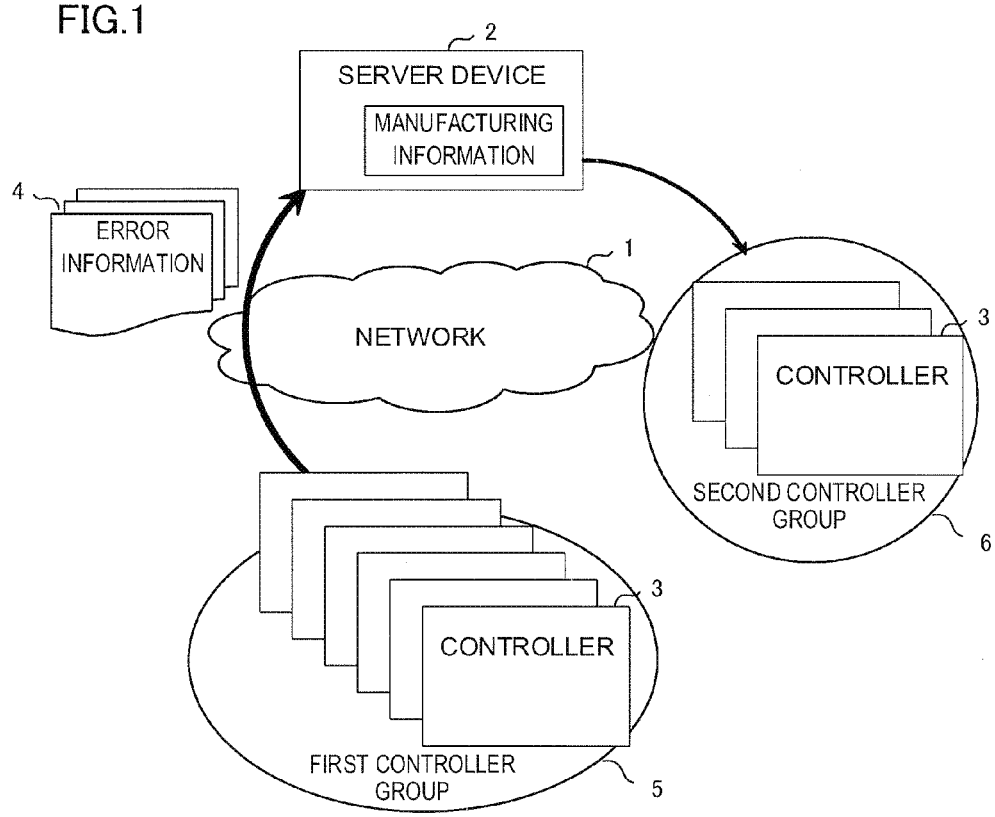
FIG. 1 is a diagram schematically illustrating a configuration of one embodiment of a failure prediction system of a controller according to the invention.

As illustrated in FIG. 1, a failure prediction system according to the invention includes a server device 2 and a plurality of controllers 3 of a first controller group, and the server device 2 and the plurality of controllers 3 are connected to each other through a network 1.

First, the failure prediction system of the controller according to a first embodiment of the invention will be described with reference to FIGS. 2 to 5B.

Figure 2:
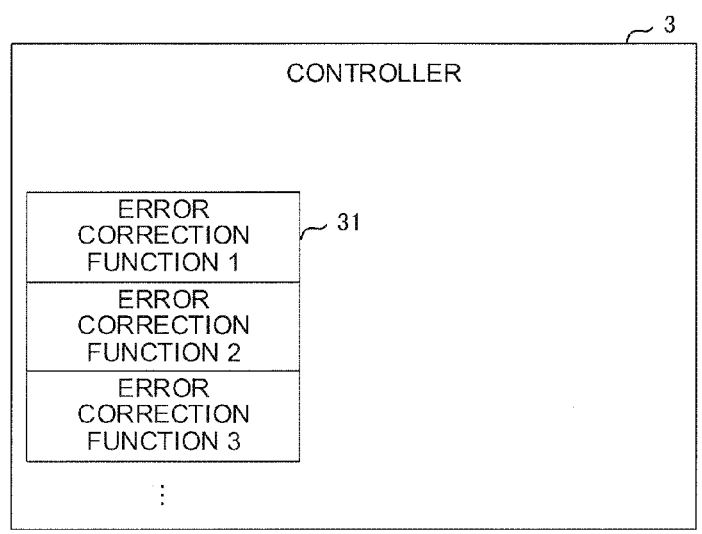
FIG. 2 is a block diagram schematically illustrating a first example of the controller of the failure prediction system of FIG. 1.

As illustrated in FIG. 2, the controller 3 includes at least one error correction circuit 31, and can correct an error generated in the controller 3. In general, errors of the controller include recoverable errors and fatal errors. Recoverable errors are errors which allow original processing to be continuously performed by correcting or retransmitting data, and include, for example, an ECC correctable error of a bus and a memory device such as a DRAM, and an ACK time out and a CRC error of PCI Express.

On the contrary, fatal errors are errors which do not allow original processing to be continued, and include, for example, an ECC uncorrectable error, a parity error, a checksum error and a CRC error of the bus and the memory device such as the DRAM, and a training error of PCI Express.

The error correction circuit 31 may be configured to include any one of an ECC function of the DRAM, a retransmission function of PCI Express to connect LSIs, and an ECC function of a parallel bus or a serial bus used in a peripheral circuit of the controller, or may be configured to two or more functions.

In a case where a plurality of circuits have different error correction functions, causes of the correctable errors occurring in these circuits are different. Accordingly, an accuracy of failure prediction can be enhanced by adding these error occurrence statuses.

Figure 3:
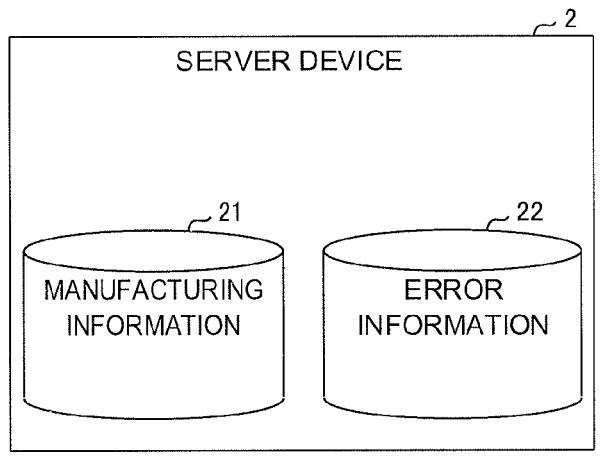
FIG. 3 is a block diagram schematically illustrating of a server device of the failure prediction system of FIG. 2.

As illustrated in FIG. 3, the server device 2 includes a manufacturing information storage unit 21 in which manufacturing information of the plurality of controllers 3 at the time of manufacturing is stored, and an error information storage unit 22 in which error information received from the plurality of controllers 3 is stored. Herein, the manufacturing information includes a maker's name of parts such as a processor and a memory used in the controller, a lot number, a revision number and a type of a printed circuit board, a client's name at a shipping destination of the controller 3, and a machine name of a client, in addition to general information such as manufactured date. The manufacturing information also includes an identification number of the controller which is used for specifying the controller. The identification number is a unique number for specifying the controller, and a MAC address of the controller or a serial number of a hard disk may be used as an individual identification number.

Figure 4:
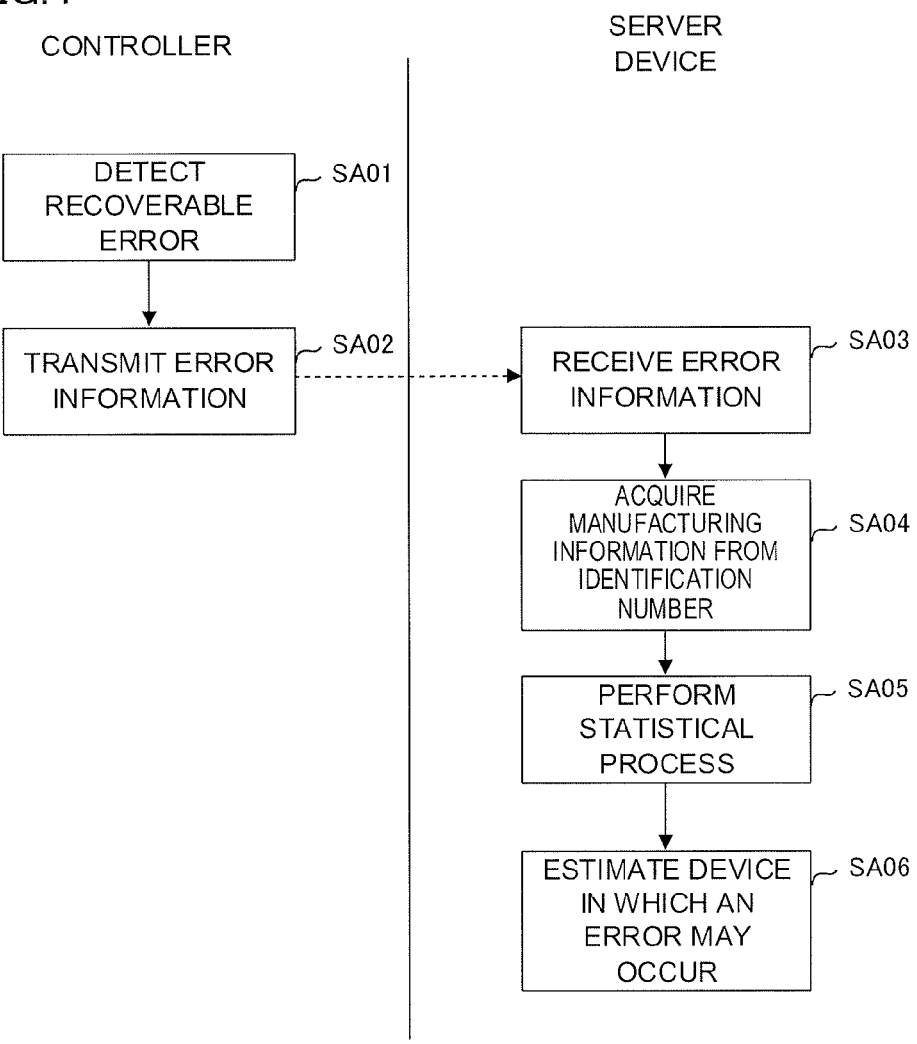
FIG. 4 is a flowchart schematically illustrating a process performed on the failure prediction system of FIG. 1.

The outline of the process performed on the failure prediction system illustrated in FIG. 1 will be described using FIG. 4.

The controller 3 notifies error information 4 on a recoverable error generated to the server device 2, together with the individual identification number of the controller 3 (Step SA01 and Step SA02). The error information includes an access source or a target address of bus transaction that has caused an error, a data length, a content of data, a bus command, a byte enable, and a start time, in addition to the information such as the number of occurrence of correctable errors generated.

As timing in which the error information 4 is notified, a time when the correctable error occurs, a time when the power is turned on, or every period of a predetermined time may be considered. In addition, the error information 4 may be notified when the number of occurrence of the correctable errors exceeds a predetermined threshold.

When notified of the error information 4 from the controller 3, the server device 2 records the received error information 4 in the error information storage unit 22, and reads the manufacturing information from the manufacturing information storage unit 21 based on the information (the individual identification number and the like) for specifying the controller included in the error information 4.

Then, a statistical process is performed based on the error information 4 collected from the plurality of controllers 3 (the first controller group) in which an error recorded in the error information storage unit 22 has occurred and the manufacturing information recorded in the manufacturing information storage unit 21 (Step SA03 to Step SA05).

Figure 5A:
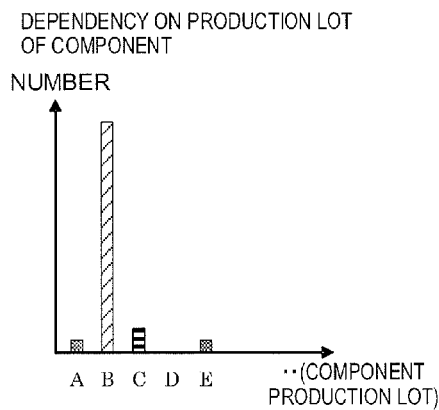
FIGS. 5A and 5B are diagrams for describing a specific example of a statistical process performed in Steps SA03 to SA05 in the flowchart of FIG. 4.
Figure 5B:
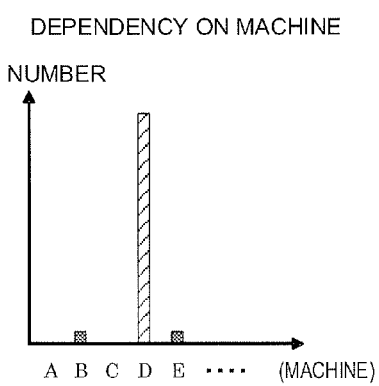

A specific example of the statistical process will be described using FIGS. 5A and 5B.

The server device 2 analyzes distributions of production lots of a component or a printed circuit board mounted in the device in which a correctable error has occurred, a type of a machine to which the controller is attached, a region of shipping destination, an option configuration of the controller, and elapsed years. In a case where an error occurrence rate is high in a specific production lot (a component production lot B illustrated in FIG. 5A), it is determined that the error depends on a component lot based on the analysis result, and a controller in which the component of the same production lot is mounted is specified from the stored manufacturing information. On the other hand, in a case where an error occurrence rate is high in a specific machine (Machine D illustrated in FIG. 5B), it is determined that the error depends on the machine, and a controller attached to the same type of the machine is specified from the manufacturing information.

Based on the result of the statistical process thus obtained, it is possible to predict that an error may occur in the near future in a controller in which the component of the same production lot specified by the statistical process is mounted or a controller which is attached to the same type of the machine, from among a second controller group 6 consisting of a plurality of controllers in which any similar error has not occurred yet. Therefore, regarding such controllers, it is possible to take steps against the error in advance. The second controller group 6 further includes a controller in which an error has once occurred but restored to its former state by replacement of components.

Further, the content of the statistical process is not limited to the above description, and a correlation between the respective items contained in the manufacturing information and the error may be obtained based on the manufacturing information of the controller in which an error has occurred and the manufacturing information of the controller to which the error has not been notified. Any method may be employed as long as a tendency of errors can be analyzed. Of course, multivariable analysis such as covariance structure analysis, multiple regression analysis, main component analysis, independent component analysis, factor analysis, discrimination analysis, quantification theory, clustering, conjoint analysis, and multi-dimensional scaling may be used.

In addition, a scheme of machine learning with neural networks may be used as the statistical process. Through machine learning, it is possible to extract a complex error occurrence condition under which an error occurs in a certain temperature range, depending on the production lot of a processor, the production lot of a DRAM, and the revision number of a printed circuit board, for example.

Next, a failure prediction system of a controller according to a second embodiment of the invention will be described with reference to FIGS. 6, 7A, and 7B.

In the first embodiment described above, the error depending on a specific lot and a specific machine is analyzed based on the error information 4 received from the controller 3. In this embodiment, a function of analyzing the error depending on an installation environment and an operation environment of the controller is assigned to the failure prediction system.

Figure 6:
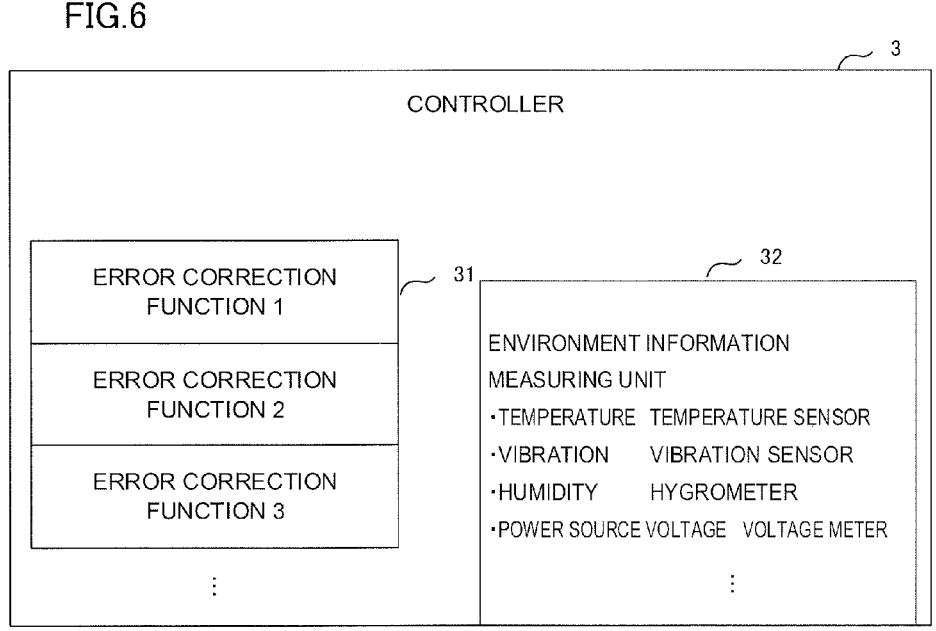
FIG. 6 is a block diagram schematically illustrating a second example of the controller of the failure prediction system of FIG. 1.
Figure 7A:
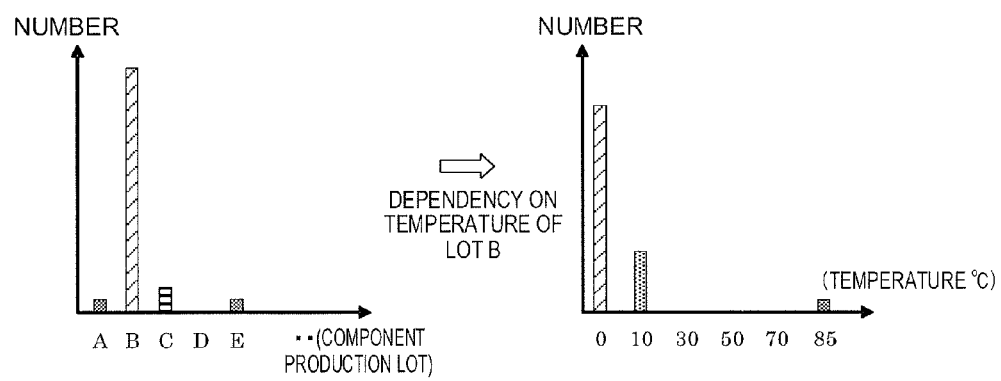
FIGS. 7A and 7B are diagrams for describing a specific example of the statistical process performed by the failure prediction system which includes the controller of FIG. 6.
Figure 7B:
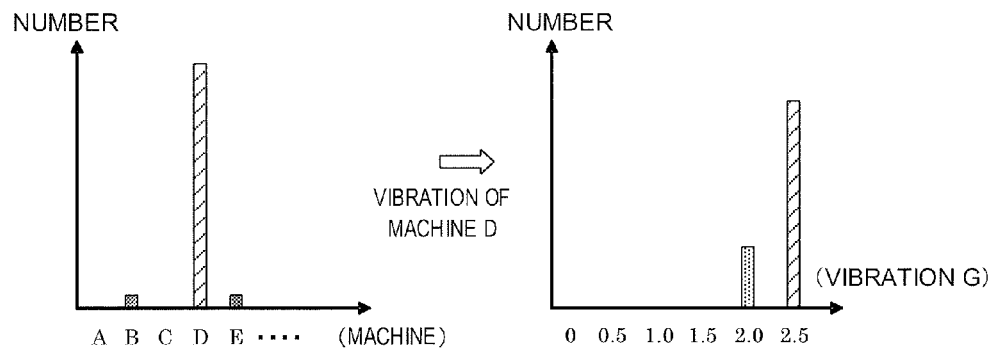

As illustrated in FIG. 6, the controller 3 of the failure prediction system according to this embodiment is provided with an environment information measuring unit 32 which measures environment information such as an ambient temperature, a component temperature, a humidity, a vibration level, a power source voltage, a consumed current, a continuous operation time, an accumulated operation time, the number of times of accumulated activation, and an IP address. The environment information may be measured using a temperature sensor, a vibration sensor, a hygrometer, and a voltage meter.

In addition, in a case where a global IP address is contained in the error information 4 received by the server device 2, a region where the controller 3 transmitting the error information 4 is installed can be specified. Therefore, it is possible to enhance an accuracy of estimation of a defect factor by adding unique information (power source situation and the like) of the region.

The controller 3 writes the measured environment information in the error information 4 and notifies the information to the server device 2.

The server device 2 performs the statistical process on the error information 4 containing the environment information that have been transmitted from the controller (in the first controller group) in which an error has occurred. In addition, the server device 2 acquires environment information from another controller (in the second controller group) in which an error has not occurred yet. Since the statistical process is performed taking the environment information into consideration, the analysis can be made in consideration of the environment dependency such as a temperature and a vibration (see the right graph of FIG. 7A and the right graph of FIG. 7B). Therefore, it is possible to enhance the accuracy in prediction of a controller which may cause a defect in the future.

Figure 8:
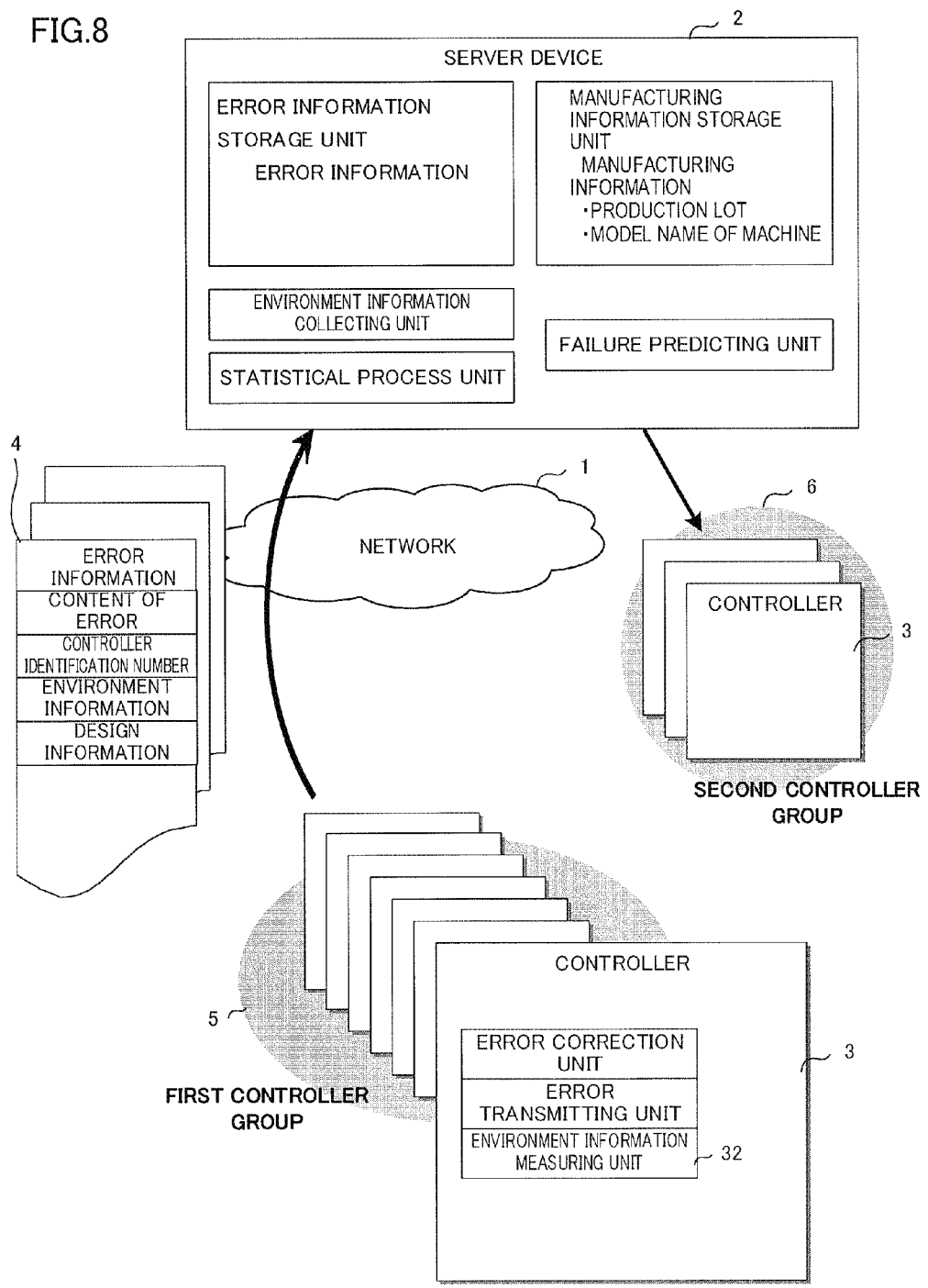
FIG. 8 is a diagram schematically illustrating a configuration of another embodiment of a failure prediction system of a controller according to the invention.

Next, a failure prediction system of a controller according to a third embodiment of the invention will be described with reference to FIG. 8.

In the first embodiment described above, the error depending on a specific lot and a specific machine is analyzed based on the error information 4 received from the controller 3. In this embodiment, a function of analyzing an error depending on amounting position of the component on a control board in the controller, a hardware configuration, and design information such as a software optional configuration is further assigned to the failure prediction system.

The controller 3 of the failure prediction system according to this embodiment is configured such that the design information of the component in which a correctable error has occurred is also notified to the server device 2. The design information includes the mounting position of the component on the control board and information such as a byte lane or a bit at which an correctable error has occurred in the case of the memory device such as the DRAM.

It is also possible to find out a design problem attributable to wiring of a signal line, from the design problem attributable to the mounting position of the component on the control board or information of a byte lane or a bit at which an correctable error has occurred in DRAM, by specifying the mounting position of the component on the control board.

In addition, the hardware configuration of the controller and the software optional configuration may be contained in the manufacturing information to be stored in the server device 2. In this case, a problem attributable to the design can be found out, too. It is possible to improve a design quality by feeding back the manufacturing information.

The invention claimed is:

1. A failure prediction system of a controller, in which a plurality of controllers are connected to a server device through a network, the controller comprising: at least one error correction unit; and an error transmitting unit transmitting error information to the server device, the error information containing a content of a correctable error that has occurred in the controller and a controller identification number for specifying the controller, wherein the server device comprises: a manufacturing information storage unit storing manufacturing information that contains at least one of a production lot of a component mounted in the controller and a model name of a machine to which the controller is attached; an error information storage unit recording the error information transmitted from the controller, a statistical process unit performing a statistical process based on the manufacturing information recorded in the manufacturing information storage unit and the error information recorded in the error information storage unit, and a failure predicting unit predicting a failure of a controller belonging to a controller group of the controllers in which an error similar to the error stored in the error information storage unit has not occurred, based on a result of the statistical process by the statistical process unit; wherein the controller further comprises an environment information measuring unit to measure environment information, the error information further contains the environment information measured by the environment information measuring unit, and the server device further comprises an environment information collecting unit to collect the environment information from a controller group in which any error has not occurred, and wherein the failure predicting unit is configured to predict a failure of the controller belonging to the controller group in which any error has not occurred, based on a result of the statistical process and the environment information stored in the environment information collecting unit collected from the controller group in which any error has not occurred.

2. The failure prediction system of the controller according to claim 1,
   wherein the error information further contains design information of a component in which an error has occurred.

* * * * *